United States Patent [19]

Furlong et al.

[11] 3,748,832
[45] July 31, 1973

[54] DRIFT ELIMINATOR

[75] Inventors: Donn B. Furlong, San Rafael; John C. Ovard, Santa Rosa, both of Calif.

[73] Assignee: Fluor Cooling Products Company

[22] Filed: July 9, 1971

[21] Appl. No.: 161,029

[52] U.S. Cl. ................ 55/257, 52/473, 55/423, 55/424, 55/440, 55/443, 55/DIG. 37, 85/26, 98/121 R, 261/DIG. 11
[51] Int. Cl. ............................................ B01d 45/08
[58] Field of Search ............... 55/257, 258, 233, 55/442, 443, 444, 445, 446, 440, 464, DIG. 37, 423, 424; 261/DIG. 11; 52/473; 85/26; 98/121 R, 40 V, 40 VM

[56] References Cited
UNITED STATES PATENTS

| | | | |
|---|---|---|---|
| 1,974,768 | 9/1934 | Daniels et al. | 55/444 X |
| 2,228,484 | 1/1941 | Ramsaur et al. | 55/257 X |
| 2,356,192 | 8/1944 | Yingling | 55/443 X |
| 2,643,736 | 6/1953 | Smith | 55/440 |
| 2,674,849 | 4/1954 | Bowden | 55/444 X |
| 2,854,090 | 9/1958 | Slough | 261/DIG. 11 |
| 3,116,989 | 1/1964 | Warren | 55/257 |
| 3,527,030 | 9/1970 | Hungate | 55/440 |
| 2,972,358 | 2/1961 | Hinden | 98/121 X |
| 1,047,765 | 12/1912 | Derby | 55/257 |
| 1,134,976 | 4/1915 | Braemer et al. | 55/257 X |
| 2,247,514 | 7/1941 | Mart | 261/DIG. 11 |
| 2,400,623 | 5/1946 | Baird et al. | 55/440 |
| 2,741,973 | 4/1956 | Swor | 160/223 X |
| 2,892,509 | 6/1959 | Baker et al. | 261/DIG. 11 |
| 3,372,530 | 3/1968 | Zimmer | 55/444 X |
| 1,974,768 | 9/1934 | Daniels et al. | 55/444 X |

FOREIGN PATENTS OR APPLICATIONS

| | | | |
|---|---|---|---|
| 644,686 | 10/1950 | Great Britain | 55/257 |
| 1,187,230 | 4/1967 | Great Britain | 98/121 |
| 508,326 | 1/1952 | Belgium | 261/DIG. 11 |
| 1,051,600 | 9/1953 | France | 55/257 |
| 1,288,235 | 2/1962 | France | 55/257 |
| 465,955 | 10/1951 | Italy | 55/DIG. 37 |

OTHER PUBLICATIONS

German Printed Application No. 1,196,128, printed July 8, 1965 (3 sheets drawing, 3 pages spec.)

"Soplasco Eliminator Blades," Southern Plastics Company, 408 Pendleton St., Columbia, S.C., 4 pages, received in the Patent Office Sept. 24, 1965.

"Swirlaway," Labconco Corporation, 8811 Prospect, Kansas City, Missouri 64132, 4 pages, received in the Patent Office Oct. 17, 1968.

*Primary Examiner*—Dennis E. Talbert, Jr.
*Attorney*—Charles M. Kaplan and Joel E. Siegel

[57] ABSTRACT

A drift eliminator to prevent airborne water droplets which are generated in a cooling tower from escaping through the discharge outlet by trapping the water droplets in the exhaust air and redirecting the air flow through the drift eliminator. The eliminator blades, hollow in cross-section, include three plane surfaces which incorporate a series of protrusions or sharp ridges for trapping water droplets which impinge on the eliminator blades and prevent same from becoming re-entrained in the air. The blades are formed with a ballistic nose of an air foil type leading edge to reduce resistance to air movement across the drift eliminator. The drift eliminator blades are assembled into unique panels to reduce field assembly time.

11 Claims, 7 Drawing Figures

INVENTORS
DONN B. FURLONG
JOHN C. OVARD
BY Joel E. Siegel
ATTORNEY

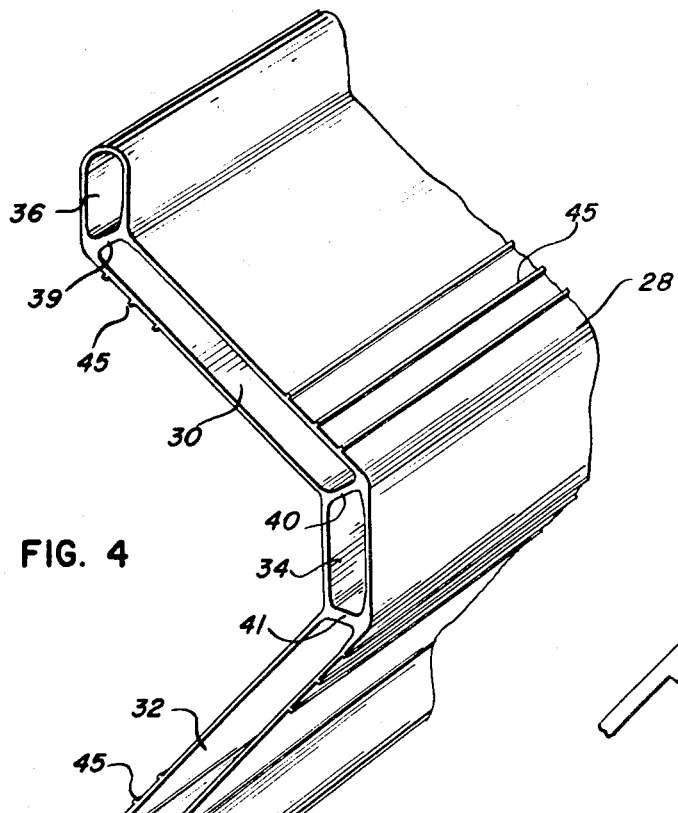
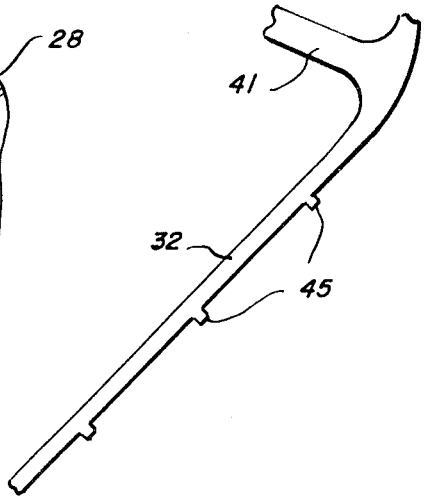
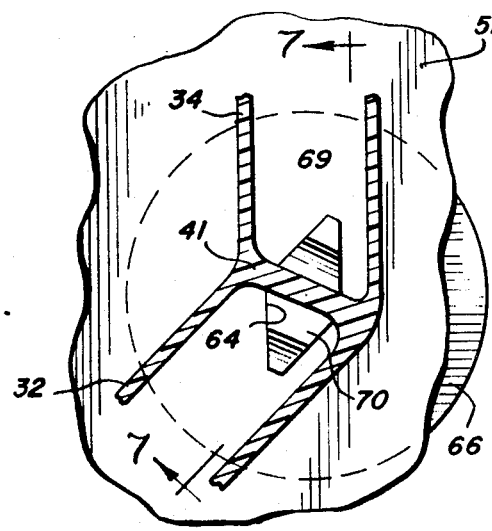
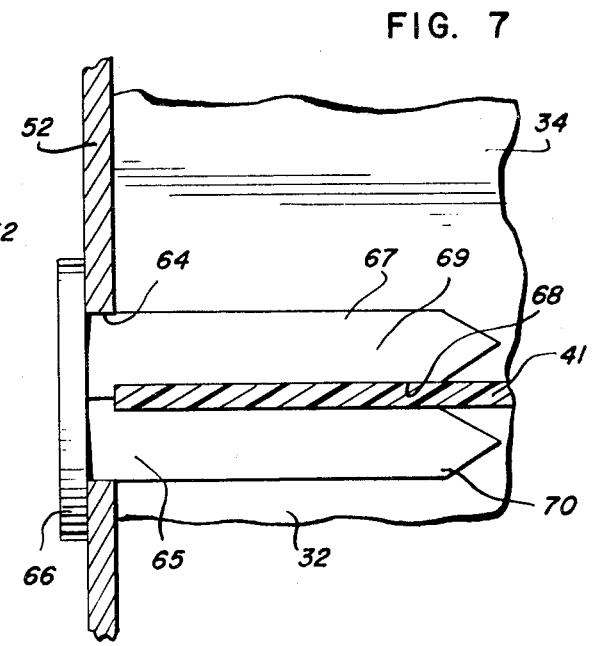
INVENTORS
DONN B. FURLONG
JOHN C. OVARD
BY Joel E. Siegel
ATTORNEY

DRIFT ELIMINATOR

BACKGROUND OF THE INVENTION

This invention relates to drift eliminators for eliminating entrained droplets of liquid from a generally upward flow of gas, and more particularly to a novel drift eliminator assembly as is used primarily in mechanical draft or natural draft water cooling towers for removing water entrained in air as it flows upward through the tower.

In cooling towers wherein water is cooled as a consequence of the movement of air therethrough, a substantial amount of the water is carried from the tower by the air unless means is provided within the path of travel of the air to eliminate the water and redirect the same downwardly to the intended point of collection within a sump underlying the fill assembly. Reference may be had to U.S. Pat. No. 2,892,509, assigned to the same assignee as the present invention, for an understanding of the conventional types of water cooling towers (crossflow and counterflow) to which the instant invention relates and the nature and disposition of drift eliminators commonly employed therein. In some installations the actual loss of water in this manner represents a serious difficulty due to the scarcity of water and the difficulty of obtaining the same, and in other installations the presence of the excessive moisture carried out by the stream of air may cause considerable inconvenience and damage to property in the immediate vicinity and in the path of the stream of air.

Heretofore known drift eliminators, of the type employed in cooling towers, have sacrificed cooling tower efficiency in order to effectively remove entrained water. These eliminators include eliminator blades having sharp leading edges which causes a relatively high resistance to flow of air therethrough, which results in reduced air velocities through the tower and consequently a reduced capacity of the tower installation of a given size. The drift eliminator of the present invention has a lower resistance to flow of air per unit of area and thus a minimum pressure drop in the air stream which results in an increase in air capacity of the tower without requiring installation of a large fan and motor. It is known to provide drift eliminators which include blades which define passageways inclined in opposite directions. However, the water which collects on the surfaces of these blades tends to tear off these surfaces and again become entrained in the air at the points where the passages change direction. The drift eliminator of the present invention includes means to retain the water on the surfaces of the eliminator blades. Prior art cooling tower drift eliminators have further required extensive field erection which has increased the erection time and cost of the tower. The drift eliminator assembly of the present invention may be factory assembled into panels which require minimum field erection time and cost.

SUMMARY OF THE INVENTION

It is a primary object of the present invention to provide a drift eliminator having a low resistance to air movement across the drift eliminator blades.

Another object is to provide a drift eliminator for gas and liquid contact apparatus, such as cooling towers, which has improved efficiency in precluding loss of water from the housing through the air discharge outlet with a minimum of pressure drop in the air stream and without substantially interfering with the flow of air through the fill area.

A further object is to provide a drift eliminator of the type used in cooling towers which induces more complete deposition of the water droplets in the air and thus permits higher air velocity through the tower without an increase in escaped water particles through the tower discharge outlet.

A still further object of the present invention is to provide a drift eliminator assembly for use in a cooling tower which is compact and may be constructed in factory assembled panels to reduce the field erection time, and which may be easily placed in or removed from operative position for repair or other purposes.

Another object is to provide a drift eliminator having the aforedescribed features which is resistant to chemicals found in the water to be cooled, possesses durability and long life, is resistant to algae and fungus organisms, possesses sufficient strength and stiffness, and is easy and inexpensive to manufacture and assemble.

The drift eliminator of the present invention prevents airborne water droplets which are generated in the cooling tower from escaping through the discharge outlet by trapping the water droplets in the high velocity exhaust air from the tower fill area and redirecting the air flow through the drift eliminator. Entrained water droplets impinge on the drift eliminator blades and drain down through the tower to the cold water collecting basin. The eliminator blades, hollow in cross-section, include three plane surfaces which incorporate a series of protrusions or sharp ridges for trapping water droplets which impinge on the eliminator blades and prevent same from becoming re-entrained in the air. The blades are formed with a ballistic nose of an air foil type leading edge to reduce resistance to air movement across the drift eliminator. The drift eliminator blades are assembled into unique panels to reduce field assembly time.

DESCRIPTION OF THE DRAWINGS

Other objects and features of the invention will become apparent to those skilled in the art as the disclosure is made in the following description of a preferred embodiment of the invention, as illustrated in the accompanying sheets of drawings, in which:

FIG. 4 is a perspective view of a portion of an eliminator blade of the type shown in FIGS. 2 and 3;

FIG. 5 is an enlarged elevational view of a portion of the eliminator blade in FIG. 4 illustrating the water entrapping projections incorporated at specific locations on the blade;

FIG. 6 is a sectional view of a portion of the drift eliminator assembly adjacent the blade end illustrating the attachment of the eliminator blade to a support angle member; and FIG. 7 is a sectional view taken along line 77 of FIG. 6.

DESCRIPTION OF A PREFERRED EMBODIMENT

Figure 1:
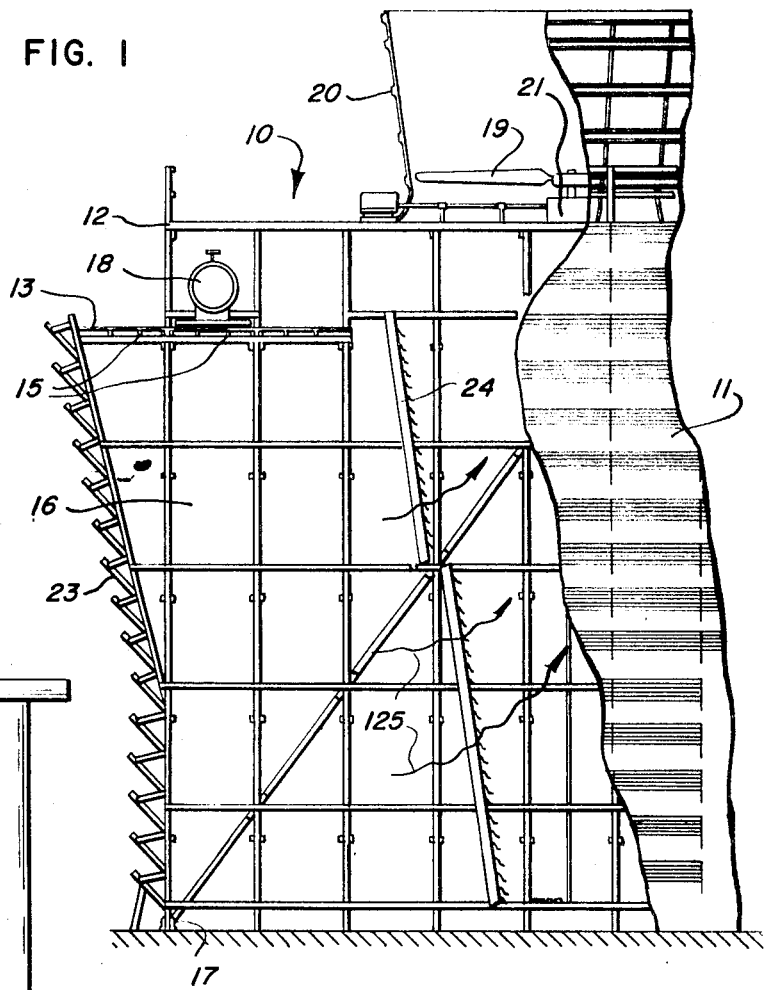
FIG. 1 is a vertical section taken through a representative crossflow cooling tower incorporating the drift eliminator of the present invention.

Referring to FIG. 1, a crossflow cooling tower 10 is shown as having a housing 11 incorporating a top 12 defining a water distributing pan 13. Liquid such as water to be cooled is pumped into the pan through inlet pipe 18 from which the liquid drains via suitable metering outlets 15. After descending through the fill or packing section 16, the liquid is collected in cold water collecting basin 17 for removal. Reference is made to U. S. Pat. No. 3,468,521, assigned to the same assignee as the present invention, for a complete disclosure of a preferred type of splash directing fill utilized in cooling tower fill sections.

A fan 19, rotated in stack 20 by drive 21, draws air laterally through the tower for upward discharge via the stack. The air passes successively through inlet openings between housing side wall inlet louvers 23, the fill 16 and through drift eliminators 24 as indicated by arrows 125.

As the water falls by gravity through fill section 16 it is broken up into droplets by splashing on the fill, and also forms a water film on the fill and structure parts. Cooling is accomplished essentially by evaporation from the surface of the droplets and films, and by sensible heat transfer from water surfaces to the circulating air. During this process, a certain number of water droplets will become entrained in the air stream. These entrained water droplets create a nuisance and potential hazard if they are allowed to escape through the fan stack to the outside air. Drift eliminators 24, in accordance with the present invention, prevent these airborne water particles, which are generated in the cooling tower, from escaping through the fan stack 20. This is accomplished by trapping the water particles in the high velocity exhaust air, from the cooling tower fill section 16, by redirecting the air flow as it passes through the drift eliminator 24. Entrained water droplets impinge and collect on the drift eliminator blades and drain down through the tower to the basin 17.

Drift eliminator assembly 24 is of special construction differing substantially from those heretofore employed in this field for the purpose of more effectively and efficiently removing the water droplets entrained in the air stream and controlling the direction of air flow so as to minimize the pressure drop in the air stream. To accomplish these results and the previously mentioned objectives the drift eliminator assembly 24 includes a plurality of eliminator panels 26 which have eliminator blades 28 supported therein. Although drift eliminator assembly 24 will be described in detail in conjunction with a crossflow cooling tower it should be understood that eliminator assembly 24 is also intended for use in counterflow cooling towers.

As best seen in FIG. 4, eliminator blade 28 is an elongated cellular member of substantially V-shape hollow cross-section including a pair of inclined first and second sections 30 and 32, respectively, having equal but opposite slopes, which are connected together at their converging ends by a third section 34. The diverging ends of sections 30 and 32 have nose sections 36 and 38 integral therewith, which are substantially parallel to section 34. The outer edges of nose sections 36 and 38 are formed of an air foil-type leading edge to reduce resistance to air movement across eliminator blade 28. Stiffener members 39, 40, 41 and 42 define the ends of sections 30, 32, 34, 36 and 38 and serve to increase the rigidity of blade 28. Blade 28 is preferably extruded of a plastic material such as polypropylene or polyvinyl chloride because of their resistance to chemicals found in cooling of process water streams, durability and long life, resistance to algae and fungus organisms, and ability to provide the needed strength and stiffness.

Eliminator blades 28 have a plurality of rigid longitudnally extending projections 45 formed on the outer and inner surfaces of sections 30 and 32 for trapping and retaining the water droplets which impinge on the surfaces blades 28. Projections 45 are preferably substantially square in cross-section, as best seen in FIG. 5, and are approximately 0.02 inches on each side. The size and number of projections 45 may vary according to the spacing of blades 28, the air flow rate through the eliminator assembly, and the degree of water elimination required. A series of projections 45 are provided at the outer portions of the inner surfaces of sections 30 and 32 and at the inner portions of the outer surfaces of sections 30 and 32 for reasons which will hereinafter become more apparent.

Figure 2:
FIG. 2 is a front elevational view of a drift eliminator panel incorporating eliminator blades of the present invention.
Figure 3:
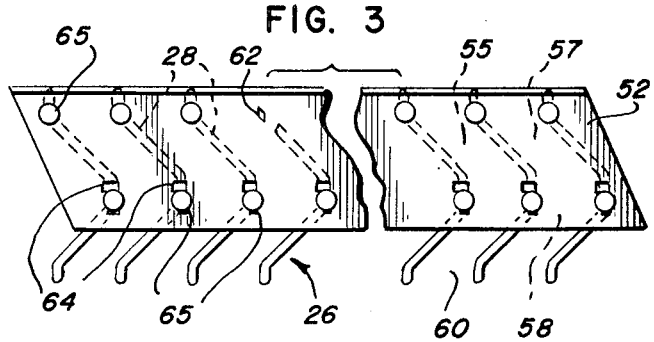
FIG. 3 is a side elevational view of a drift eliminator panel incorporating eliminator blades of the present invention.

As best seen in FIGS. 1–3, eliminator blades 28 are supported between a pair of angle support members 50 and 52 in a spaced and facially opposed relationship to one another so as to define a plurality passageways 55, allowing the passage of air therethrough. Each passageway 55 includes an entry passage 57 formed by the facing sections 30 of adjacent blades 28, a short connecting passage 58 formed by the facing sections 34 of adjacent blades 28, and an exit passage 60 formed by the facing sections 32 of adjacent blades 28. Passages 57 are inclined to the path of travel of the water droplet entrained air to permit direct impingement of the air against the surfaces thereof. Passages 60 are inclined in the opposite direction to passages 57 such that the air passing through passages 57 and 58 will impinge against the surfaces of passage 60. Blades 28, and consequently passageways 55, are preferably longitudinally inclined about 10° so as to cause the water collected on the blade surface to flow towards the ends of the blades and then drop through the tower to the collecting basin 17.

As best seen in FIGS. 3, 6, and 7, blades 28 are secured to support members 50 and 52 to form panels 26 in a unique manner which securely positions blades 28 in a way which permits water collected on the blade surfaces to pass through support members 50 and 52 and flow down their outer surfaces to collecting basin 17. Support members 50 and 52 each have a first series of spaced openings 62 longitudinally extending adjacent the entry edge thereof and a second series of spaced openings 62 longitudinally extending adjacent the other edge thereof. Pins 65 extend through openings 62 and 64 and securely grasp the ends of blades 28. Pins 65 include a head portion 66 and a stem portion 67. Stem portion 67 is preferably of non-circular cross-section, i.e., a diamond shape. Openings 62 are similarly shaped to receive stem 67 and prevent rotation therein. A longitudinally extending slot 68 is cut out of stem 67 so as to define a pair of finger members 69 and 70 which grasp and hold blades 28 in a fixed position. The outer ends of members 69 and 70 may be bevelled to facilitate engagement of blades 28. Slot 68 is preferably dimensioned slightly less than the thickness of stiffener members 39 and 41 such that as pin 65 passes through opening 62 and 64 and is forced against stiffener members 39 and 41, the fingers 69 and 70 securely receive members 39 and 41 therebetween. Pins 50 may, in addition, be solvent welded at the contact surfaces between stem 67 and members 39 and 41 and at the contact surfaces between head 66 and members 50 and 52. Openings 62 and 64 are positioned on member 50 and 62 such that when stiffener members 39 and 41 are in respective alignment with openings 62 and 64 section 30 of blade 28 is approximately inclined 45° to the direction of air flow. Openings 64 are dimensioned and shaped such that head 66 will not pass therethrough and will not completely cover opening 64 so as to permit water from the surfaces of blades 28 to pass through a portion of opening 64. As seen in FIG. 3 and 6, openings 64 are angular cut-outs which are dimensioned to receive stem 67 through a portion thereof, prevent head 66 from passing therethrough, and still leave a portion not covered by head 66 to permit water collected on blades 28 to pass therethrough.

Panels 26 are secured to the tower structural supports in a conventional manner such that they are positioned inboard of fill section 16 and in a facially opposed relationship to inlet louvers 23. Panels 26 are preferably longitudinally inclined approximately 10° so as to cause water formed on the surfaces of blades 28 to flow towards the respective ends thereof.

In the operation of the tower, water to be cooled is supplied through inlet pipe 18 into pan 13 and distributing over fill section 16 via metering outlets 15. The water then falls by gravity through fill section 16 where it is broken up into droplets by splashing on the fill, and also forms a water film on the fill and structure parts. Air is drawn into the tower through inlet louvers 23 and then through fill section 16 by fan 19. The gravitating water is effectively cooled by the draft of air passing through fill section 16 and is collected in cold water basin 17. Cooling is accomplished essentially by evaporation from the surface of the droplets and films and by sensible heat transfer from water surfaces to the circulating air. During the process, a certain number of water droplets become entrained in the air stream and create a nuisance and potential hazard if they are allowed to escape through the fan stack 20 to the outside air.

The air with the water droplets entrained therein flows from fill section 16 through drift eliminators 24, as indicated by arrows 125 in FIG. 1, and out fan stack 20. The water entrained air enters passages 57 of eliminators 24 changing its direction of flow from substantially horizontal to an inclined direction as it contacts the lower surfaces of passages 57. The force of the air stream on the entrained droplets is sufficient to cause most of the droplets to gravitate towards the lower surface of passage 57 and collect thereon. The water so collected tends to migrate and build-up towards the upper end of the lower surfaces of passages 57. Projections 45, positioned at said upper end, substantially prevent the water from tearing off the lower surfaces of passages 57 and becoming re-entrained in the air as the stream leaves passage 57 and enters passages 58. The finer droplets, and any heavy ones which may elude elimination in passages 57, are carried by the air stream through passages 58 into passages 60 where it changes direction again upon contact with the upper surface of passages 60. The droplets entrained in the air, being heavier than air, are thrown against the upper surface of passages 60 by centrifugal action and tend to migrate to the outer end thereof. Projections 45, positioned at said outer end, substantially prevent the water from tearing off the outer end of the upper surfaces of passages 60 and becoming re-entrained in the air as it leaves passages 60 to be drawn out through fan stack 20.

As heretofore mentioned, blades 28 and consequently passages 57 and 60 are longitudinally inclined approximately 10°. This causes the water collected on the surfaces of passages 57 and 60 to flow downward towards support members 50 and 52 and then through openings 64. The water is then free to gravitate down the outer surfaces of support members 50 and 52 to be collected in basin 17.

The drift eliminator 24 of the present invention provides more complete deposition of water droplets entrained in the air than prior art eliminators and reduces the amount of water collected on the eliminator blades 28 that becomes re-entrained in the air as the air stream passes through the drift eliminator. Further resistance to air movement across drift eliminator is reduced because of ballistic nose 36 provided at the leading edge of blades 28. The unique construction of eliminator panels 26 permits water collected on blades 28 to pass therethrough and run down the sides thereof, and permits panels 26 to be factory assembled so as to reduce on-site construction cost.

Although described with respect to a cross-flow cooling tower it is contemplated that drift eliminator 24 may be equally as advantageously used in conjunction with a counterflow cooling tower. Those skilled in the art will appreciate that by merely horizontally disposing panels 26 below the stack of a conventional counterflow cooling tower the aforedescribed advantages are equally obtainable.

While the embodiment described herein is at present considered to be preferred, it will be understood that various modifications and improvements may be made therein, and it is intended to cover in the appended claims all such modifications and improvements as fall within the true spirit and scope of the invention.

We claim:

1. In combination with a water cooling tower having an air inlet, an air outlet and means for directing currents of air along a path of travel from said inlet to said outlet in substantially horizontal, intersecting relationship to water gravitating within the tower, a drift eliminator within the tower, disposed to remove droplets of water entrained in said air immediately prior to discharge of said air through said outlet; said drift eliminator including a plurality of eliminator panels comprising:

a. a plurality of longitudinally extending eliminator blades supported at their respective ends by a pair of support members, said support members having a plurality of openings passing therethrough;

b. said eliminator blades being of a cellular structure having longitudinally extending stiffening members dividing said blades into a plurality of sections; and c. pin means for securing said eliminator blades to said support members, said pin means having a head portion and a shank portion, said shank portion passing through said opening in said support member and grasping said blade stiffening member, said head portion being dimensioned to prevent passage of it through said support member opening;

d. at least some of said openings passing through said support members being dimensioned and shaped to prevent said head portion from passing therethrough and also to permit water collected on said blades to flow therethrough.

2. The invention of claim 1 wherein said shank portion includes a longitudinally extending slot which receives said blade stiffening member.

3. The invention of claim 2 wherein said slot is dimensioned slightly less than the thickness of said blade stiffening member such that said shank portion securely grasps said stiffening member as it is forced into said slot.

4. The invention of claim 3 wherein each end of each eliminator blade is secured to said support member in at least two locations.

5. The invention of claim 1 wherein said eliminator blades are longitudinally inclined to cause said water collected on said blades to flow through said openings in said support members.

6. The invention of claim 1 wherein the edges of said eliminator blades which make first contact with said water droplet entrained air are formed with a ballistic nose of an air foil type leading edge to reduce resistance to air movement across said drift eliminator.

7. The invention of claim 1 wherein said eliminator blades are integrally formed of a plastic material.

8. The invention of claim 1 wherein said eliminator blades are integrally formed of polypropylene material.

9. The invention of claim 1 wherein said eliminator blades are integrally formed of polyvinyl-chloride material.

10. In combination with a water cooling tower having an air inlet, an air outlet and means for directing currents of air along a path of travel from said inlet to said outlet in substantially horizontal, intersecting relationship to water gravitating within the tower, a drift eliminator within the tower, disposed to remove droplets of water entrained in said air immediately prior to discharge of said air through said outlet; said drift eliminator including a plurality of eliminator panels comprising:

a. a plurality of longitudinally extending eliminator blades supported at their respective ends by a pair of support members, said support members having a plurality of openings passing therethrough;

b. said eliminator blades being of a cellular structure having longitudinally extending stiffening members dividing said blades into a plurality of sections; and c. pin means for securing said eliminator blades to said support members, said pin means having a head portion and a shank portion, said shank portion passing through said opening in said support member and grasping said blade stiffening member, said head portion being dimensioned to prevent passage of it through said support member opening;

d. each of said eliminator blades being formed of first and second inclined sections having opposite slopes which are secured together at their converging ends by a third section of lesser width than said first and second sections, the end of said first section which makes first contact with said water droplet entrained air includes a ballistic nose section of an air foil-type leading edge attached thereto, said stiffening members defining the respective ends of said first, second and third sections.

11. The invention of claim 10 wherein each end of each eliminator blades is secured to said supporting member by a pair of said pin means positioned to grasp the stiffener members associated with the ends of said first and second section which make first contact with said water droplet entrained air.

* * * * *

PO-1050
(5/69)

UNITED STATES PATENT OFFICE
CERTIFICATE OF CORRECTION

Patent No. 3,748,832    Dated July 3, 1973

Inventor(s)   Donn B. Furlong, John C. Ovard

It is certified that error appears in the above-identified patent and that said Letters Patent are hereby corrected as shown below:

In column 2, line 65 delete "77" and insert -- 7-7--.

On the cover page, the assignee should read -- Ecodyne Corporation

Signed and sealed this 27th day of November 1973.

(SEAL)
Attest:

EDWARD M. FLETCHER, JR.
Attesting Officer

RENE D. TEGTMEYER
Acting Commissioner of Patents